(12) United States Patent
Itagaki et al.

(10) Patent No.: US 12,158,633 B2
(45) Date of Patent: Dec. 3, 2024

(54) LENS DRIVING DEVICE, CAMERA MODULE, AND CAMERA-MOUNTED DEVICE

(71) Applicants: Miniswys S.A., Biel/Bienne (CH); Yoichi Itagaki, Tokyo (JP)

(72) Inventors: Yoichi Itagaki, Tokyo (JP); Raphael Hoesli, Nidau (CH); Maxime Roten, Fenin (CH)

(73) Assignees: Miniswys S.A., Biel/Bienne (CH); Mitsumi Electric Co., Ltd., Tokyo (JP)

( * ) Notice: Subject to any disclaimer, the term of this patent is extended or adjusted under 35 U.S.C. 154(b) by 906 days.

(21) Appl. No.: 17/267,811

(22) PCT Filed: Aug. 9, 2019

(86) PCT No.: PCT/JP2019/031764
§ 371 (c)(1),
(2) Date: Feb. 11, 2021

(87) PCT Pub. No.: WO2020/036157
PCT Pub. Date: Feb. 20, 2020

(65) Prior Publication Data
US 2021/0173175 A1 Jun. 10, 2021

(30) Foreign Application Priority Data
Aug. 13, 2018 (JP) .................. 2018-152250

(51) Int. Cl.
*G02B 7/09* (2021.01)
*G02B 7/08* (2021.01)
(Continued)

(52) U.S. Cl.
CPC ............... *G02B 7/09* (2013.01); *G02B 7/08* (2013.01); *G02B 27/646* (2013.01); *G03B 3/10* (2013.01);
(Continued)

(58) Field of Classification Search
CPC .......... G02B 7/09; G02B 7/08; G02B 27/646; G02B 27/64; G03B 3/10; G03B 5/02;
(Continued)

(56) References Cited

U.S. PATENT DOCUMENTS

2004/0013420 A1 1/2004 Hara
2007/0164635 A1 7/2007 Witteveen et al.
(Continued)

FOREIGN PATENT DOCUMENTS

CN 101165528 4/2008
JP 09-022039 1/1997
(Continued)

OTHER PUBLICATIONS

International Search Report and the Written Opinion Dated Nov. 26, 2019 From the International Searching Authority Re. Application No. PCT/JP2019/031764. (10 Pages).

*Primary Examiner* — Thomas K Pham
*Assistant Examiner* — Kuei-Jen L Edenfield

(57) ABSTRACT

A lens driving device, a camera module, and a camera-mounted device are provided, which are capable of reducing the effect of external magnetism and of being reduced in size and profile thereof. The lens driving device includes an AF driving part configured to move, with respect to an AF fixing part, an AF movable part in a Z-direction extending along an optical axis, and an OIS driving part configured to move, with respect to an OIS fixing part, an OIS movable part in an X-direction and a Y direction each orthogonal to optical axis. The OIS driving part and the AF driving part are each composed of an ultrasonic motor. In a rectangle defined by two sides where the OIS driving part is disposed, the AF driving part is disposed along a side different from the two sides.

12 Claims, 12 Drawing Sheets

(51) Int. Cl.
  *G02B 27/64* (2006.01)
  *G03B 3/10* (2021.01)
  *G03B 5/02* (2021.01)
  *H04N 23/54* (2023.01)
  *H04N 23/68* (2023.01)

(52) U.S. Cl.
  CPC .............. *G03B 5/02* (2013.01); *H04N 23/54* (2023.01); *H04N 23/687* (2023.01); *G03B 2205/0015* (2013.01); *G03B 2205/0061* (2013.01)

(58) Field of Classification Search
  CPC .... G03B 2205/0015; G03B 2205/0061; G03B 13/36; G03B 30/00; H04N 23/54; H04N 23/687; H04N 23/57; H04N 23/68; H02N 2/06; H02N 2/028; H02N 2/04; H02N 2/02
  USPC ....... 359/824, 557, 819; 348/208.11, 208.02, 348/345; 396/55, 133
  See application file for complete search history.

(56) References Cited

U.S. PATENT DOCUMENTS

| | | |
|---|---|---|
| 2011/0141340 A1 | 6/2011 | Yumiki et al. |
| 2015/0055220 A1* | 2/2015 | Lim ................... G02B 27/646 359/557 |
| 2017/0052386 A1* | 2/2017 | Siegrist ................ H02K 41/02 |
| 2017/0052387 A1 | 2/2017 | Yu et al. |

FOREIGN PATENT DOCUMENTS

| | | |
|---|---|---|
| JP | 2004-056878 | 2/2004 |
| JP | 2008-503995 | 2/2008 |
| JP | 2012-133396 | 7/2012 |
| JP | 2013-210550 | 10/2013 |
| JP | 2016-191849 | 11/2016 |
| JP | 2018-072731 | 5/2018 |
| KR | 10-2015-0124126 | 11/2015 |
| KR | 10-2016-0012455 | 2/2016 |
| KR | 10-1813392 | 12/2017 |
| WO | WO 2015/123787 | 8/2015 |
| WO | WO 2020/036157 | 2/2020 |

* cited by examiner

LENS DRIVING DEVICE, CAMERA MODULE, AND CAMERA-MOUNTED DEVICE

TECHNICAL FIELD

The present invention relates to an auto-focusing and shake-correcting lens driving device, and to a camera module and a camera-mounted device.

BACKGROUND ART

In general, a small-sized camera module is mounted in mobile terminals, such as smartphones. A lens driving device is applied in such a camera module (see, for example, Patent Literature (hereinafter, referred to as "PTL") 1). This lens driving device has an autofocus function of automatically performing focusing during capturing a subject (hereinafter referred to as "AF (Auto Focus) function") and a shake correction function of reducing an image defect by optically correcting a camera-shake (vibration) that occurs when capturing an image (hereinafter referred to as "OIS (Optical Image Stabilization) function").

The lens driving device having the AF and OIS functions includes an autofocus driving part (hereinafter referred to as "AF driving part") for moving a lens part in an optical-axis direction; and a shake-correction driving part (hereinafter referred to as "OIS driving part") for rocking the lens part in a plane orthogonal to the optical-axis direction. In PTL 1, a voice coil motor (VCM) is applied to the AF driving part and the OIS driving part.

In recent years, a camera module having a plurality of (typically two) lens driving devices is put into practical use (so-called dual camera). A dual camera has various possibilities, such as allowing two images having different focal lengths to be simultaneously captured, allowing a still image and a moving image to be simultaneously captured, and the like, depending on use scenes.

CITATION LIST

Patent Literature

[PTL 1]
  Japanese Patent Application Laid-Open No. 2013-210550
[PTL 2]
  WO 2015/123787

SUMMARY OF INVENTION

Technical Problem

As disclosed in PTL 1, however, the lens driving device using VCM may impair its operation with high precision because it is affected by external magnetism. In particular, a dual camera having lens driving devices juxtaposed with each other is more likely to cause magnetic interference between the lens driving devices.

PTL 2 discloses a lens driving device employed with an ultrasonic motor in the AF driving part and the OIS driving part. The lens driving device disclosed in PTL 2 can reduce the effect of external magnetism because it does not include a magnet, but has a complicated structure, which makes it difficult to reduce the size and profile of the lens driving device.

An object of the present invention is to provide a lens driving device, a camera module, and a camera-mounted device, which are capable of reducing the effect of external magnetism and of being reduced in size and profile thereof.

Solution to Problem

A lens driving device according to the present invention includes:
  an autofocus part including:
    an autofocus movable part to be disposed at an autofocus fixing part; and
    an autofocus driving part configured to move, with respect to the autofocus fixing part, the autofocus movable part in a Z-direction extending along an optical axis, and
  a shake-correction part including:
    a shake-correction fixing part;
    a shake-correction movable part including the autofocus part; and
    a shake-correction driving part configured to move, with respect to the shake-correction fixing part, the shake-correction movable part in an X-direction and a Y direction each orthogonal to the optical axis, in which
  the shake-correction driving part includes:
    a first shake-correction driving part to be disposed along the X-direction and configured to move the shake-correction movable part in the X-direction; and a second shake-correction driving part to be disposed along the Y-direction and configured to move the shake-correction movable part in the Y-direction, wherein
  the first and the second shake-correcting driving parts respectively include:
    shake-correcting ultrasonic motors composed of: shake-correcting piezoelectric elements;
    and shake-correcting resonance parts configured to resonate with vibrations of the shake-correcting piezoelectric elements and to convert a vibrational motion into a linear motion in the X-direction or the Y-direction, the shake-correcting ultrasonic motors being configured to be disposed at the shake-correction fixing part; and
    shake-correcting power transmitting parts configured to couple the shake-correcting ultrasonic motors and the shake-correction movable part together and to transmit the linear motion in the X-direction or the Y-direction to the shake-correction movable part, and wherein
  the autofocus driving part includes:
    an auto-focusing ultrasonic motor composed of: an auto-focusing piezoelectric element; and auto-focusing resonance part configured to resonate with vibrations of the auto-focusing piezoelectric element and to convert a vibration motion into a linear motion in the Z-direction, the auto-focusing ultrasonic motor being configured to be disposed at the autofocus movable part; and
    an auto-focusing power transmitting part configured to couple the auto-focusing ultrasonic motor and the autofocus fixing part together and to transmit the linear motion to the autofocus fixing part, and in which,
  in a rectangle defined by two sides where the first shake-correction driving part and the second shake-correction driving part are disposed, the autofocus driving part is disposed along a side different from the two sides.

A camera module according to the present invention includes:
  the lens driving device described above;
  a lens part to be mounted at the autofocus movable part; and an image capturing part configured to capture a subject image imaged by the lens part.

A camera-mounted device according to the present invention is a camera-mounted device that is an information device or a transporting device, the camera-mounted device including:

the camera module described above; and
an image processing part configured to process image information obtained by the camera module.

Advantageous Effects of Invention

According to the present invention, it is made possible to provide a lens driving device, a camera module, and a camera-mounted device, which are capable of reducing the effect of external magnetism and of being reduced in size and profile thereof.

DESCRIPTION OF EMBODIMENTS

Hereinafter, an embodiment of the present invention will be described in detail with reference to the drawings.

Figure 1A:
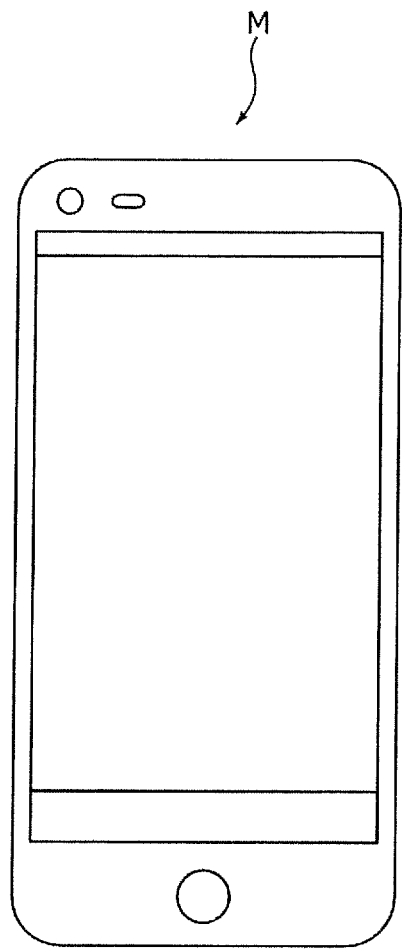
FIGS. 1A and 1B illustrate a smartphone in which a camera module according to an embodiment of the present invention is mounted.
Figure 1B:
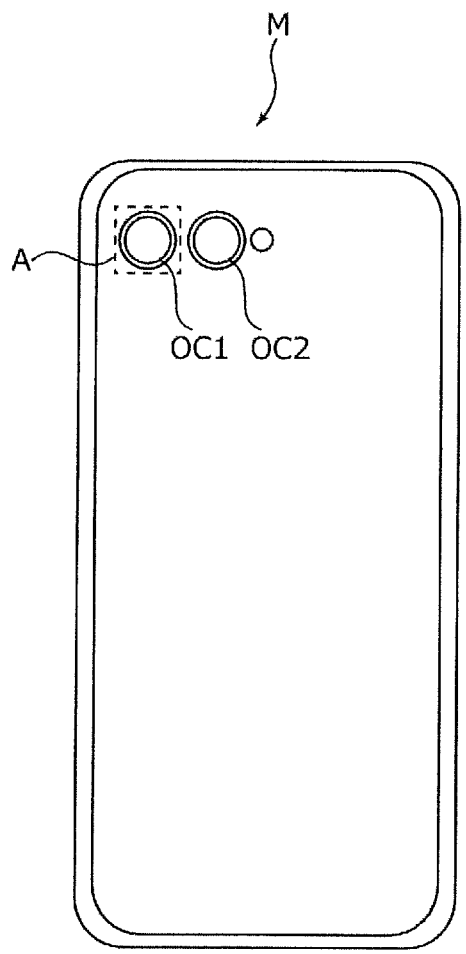

FIGS. 1A and 1B illustrate smartphone M (camera-mounted device) in which camera module A according to an embodiment of the present invention is mounted. FIG. 1A is a front view of smartphone M and FIG. 1B is a rear view of smartphone M.

Smartphone M has a dual camera consisting of two back cameras OC1 and OC2. In the present embodiment, camera module A is applied to back cameras OC1 and OC2.

Camera module A has an AF function and an OIS function, and is capable of automatically performing focusing during capturing a subject and of capturing images without image blurring by optically correcting a camera-shake (vibration) that occurs when capturing images.

Figure 2:
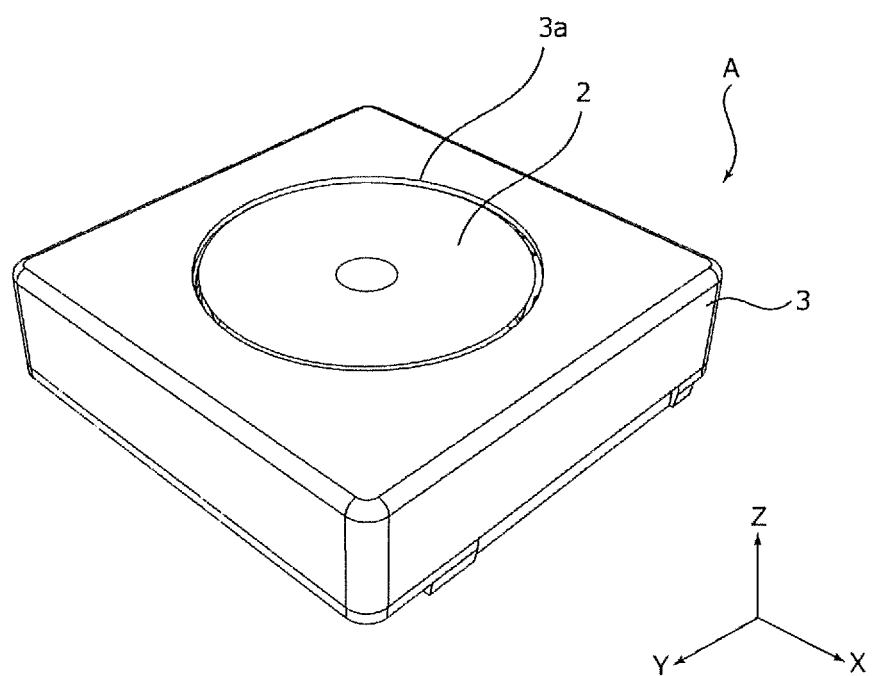
FIG. 2 is a perspective view of an external appearance of the camera module.
Figure 3A:
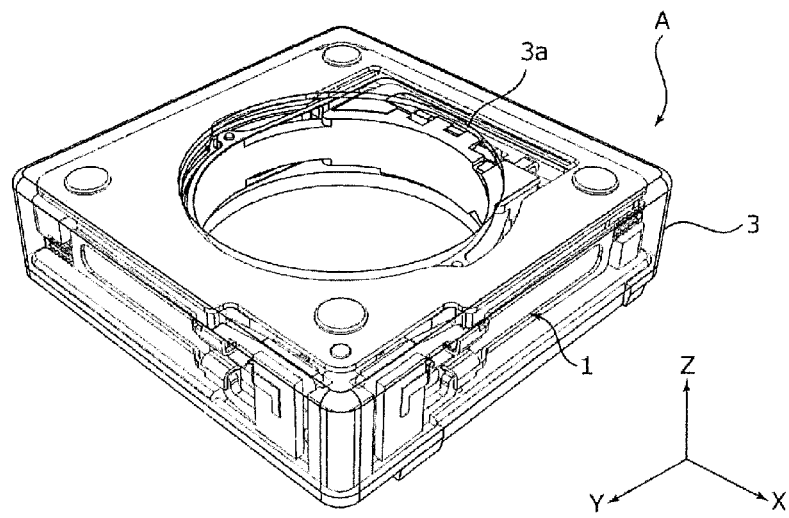
FIGS. 3A and 3B are perspective views of the camera module.
Figure 3B:
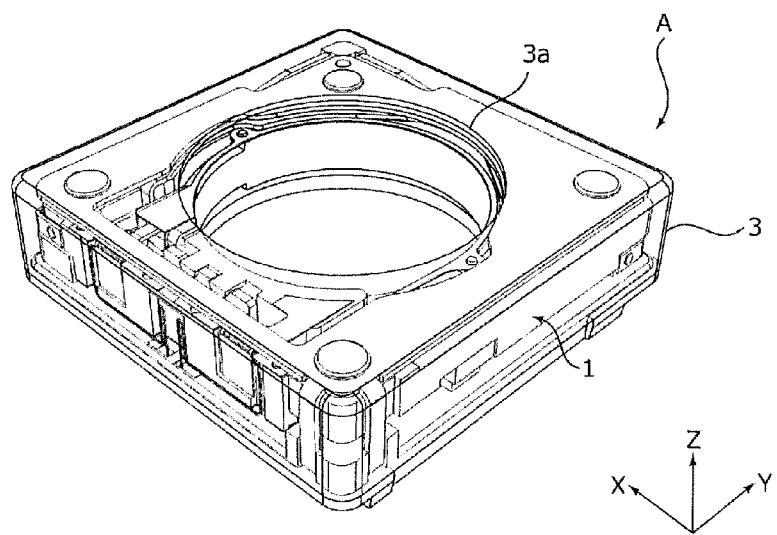

FIG. 2 is a perspective view of an external appearance of camera module A. FIGS. 3A and 3B are perspective views of camera module A. FIG. 3B illustrates a state in which FIG. 3A has been rotated by 180° around the Z-axis. FIGS. 3A and 3B omit lens part 2. As shown in FIGS. 2, 3A and 3B, descriptions will be given for the present embodiment with an orthogonal coordinate system (X, Y, Z). The same orthogonal coordinate system (X, Y, Z) is also used for illustration of below-mentioned figures.

Camera module A is mounted such that the vertical direction (or the horizontal direction) is the X-direction, the horizontal direction (or the vertical direction) is the Y-direction, and the front-rear direction is the Z-direction during actually capturing of an image with smartphone M. That is, the Z-direction is the optical-axis direction, the upper side in the figures is the light reception side in the optical-axis direction, and the lower side is the image formation side in the optical-axis direction. In addition, the X- and Y-directions orthogonal to the Z-axis are referred to as "optical-axis-orthogonal directions", and the XY plane is referred to as "optical-axis-orthogonal plane".

As shown in FIGS. 2, 3A, and 3B, camera module A includes lens driving device 1 which can perform the AF function and the OIS function; lens part 2 including a cylindrical lens barrel that houses a lens; an image capturing part (not illustrated) configured to capture a subject image imaged by lens part 2, cover 3 which covers the entire camera module A, and the like.

Cover 3 is a lidded rectangular cylindrical body in plan view in the optical-axis direction. In the present embodiment, cover 3 has a square shape in plan view. Cover 3 includes, at its upper surface, a substantially circular opening 3a. Lens part 2 faces outside from opening 3a. Cover 3 is fixed to base 21 (see FIG. 4) of OIS fixing part 20 in lens driving device 1, for example, by adhesion. Cover 3 contacts the upper portion (damper 23) of lens driving device 1.

The image capturing part (not illustrated) is disposed on the image formation side of lens driving device 1 in the optical-axis direction. The image capturing part (not illustrated) includes, for example, an image sensor board and an imaging device mounted on the image sensor board. The imaging device is composed of, for example, a charge-coupled device (CCD) image sensor, a complementary metal oxide semiconductor (CMOS) image sensor, or the like. The imaging device captures a subject image imaged by lens part 2. Lens driving device 1 is mounted in the image sensor board (not illustrated) and is mechanically and electrically connected thereto. A control unit that performs driving control of lens driving device 1 may be provided on the image sensor board or on a camera-mounted device having camera module A mounted thereto (in the present embodiment, smartphone M).

Figure 4:
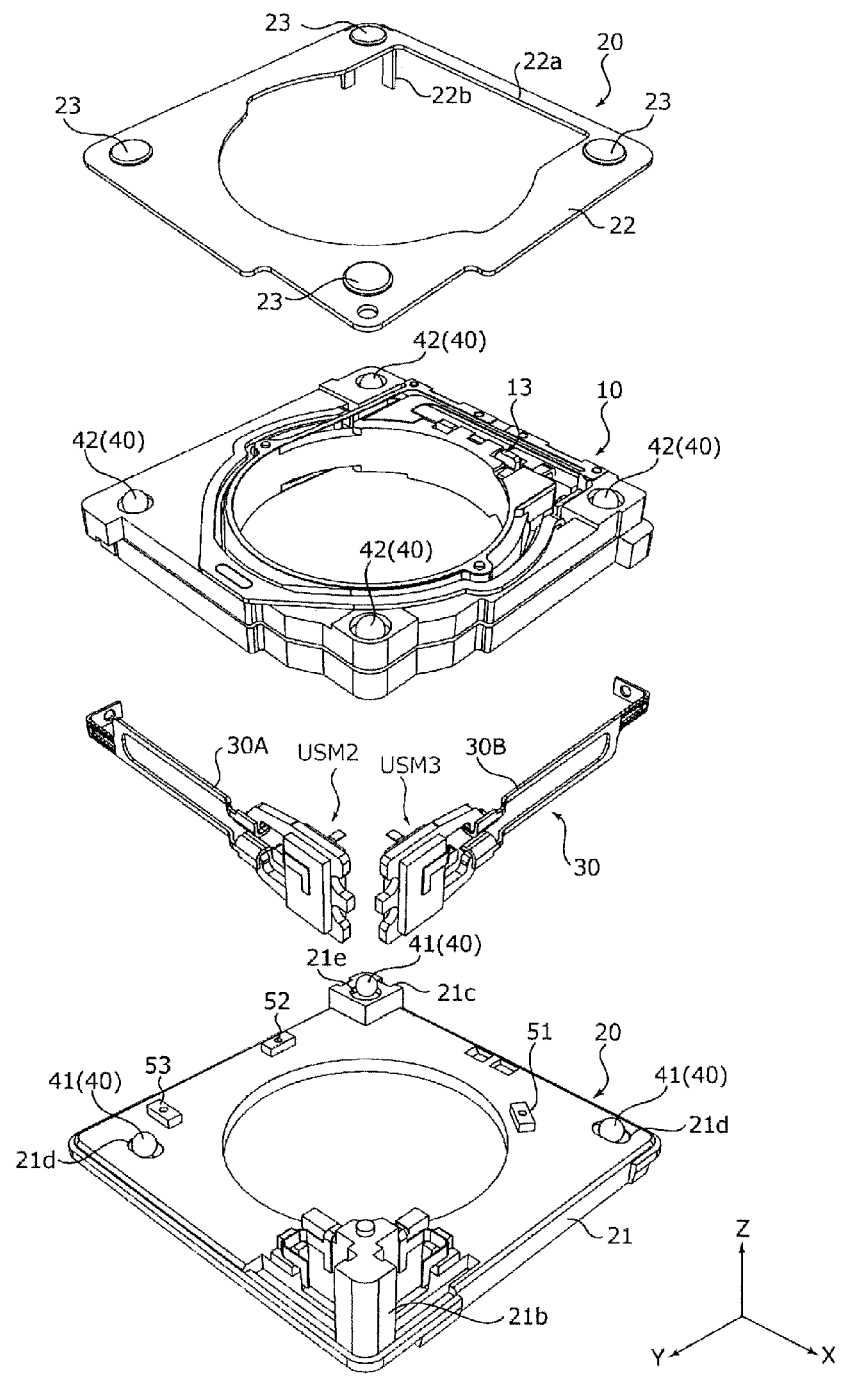
FIG. 4 is an exploded perspective view of a lens driving device.
Figure 5:
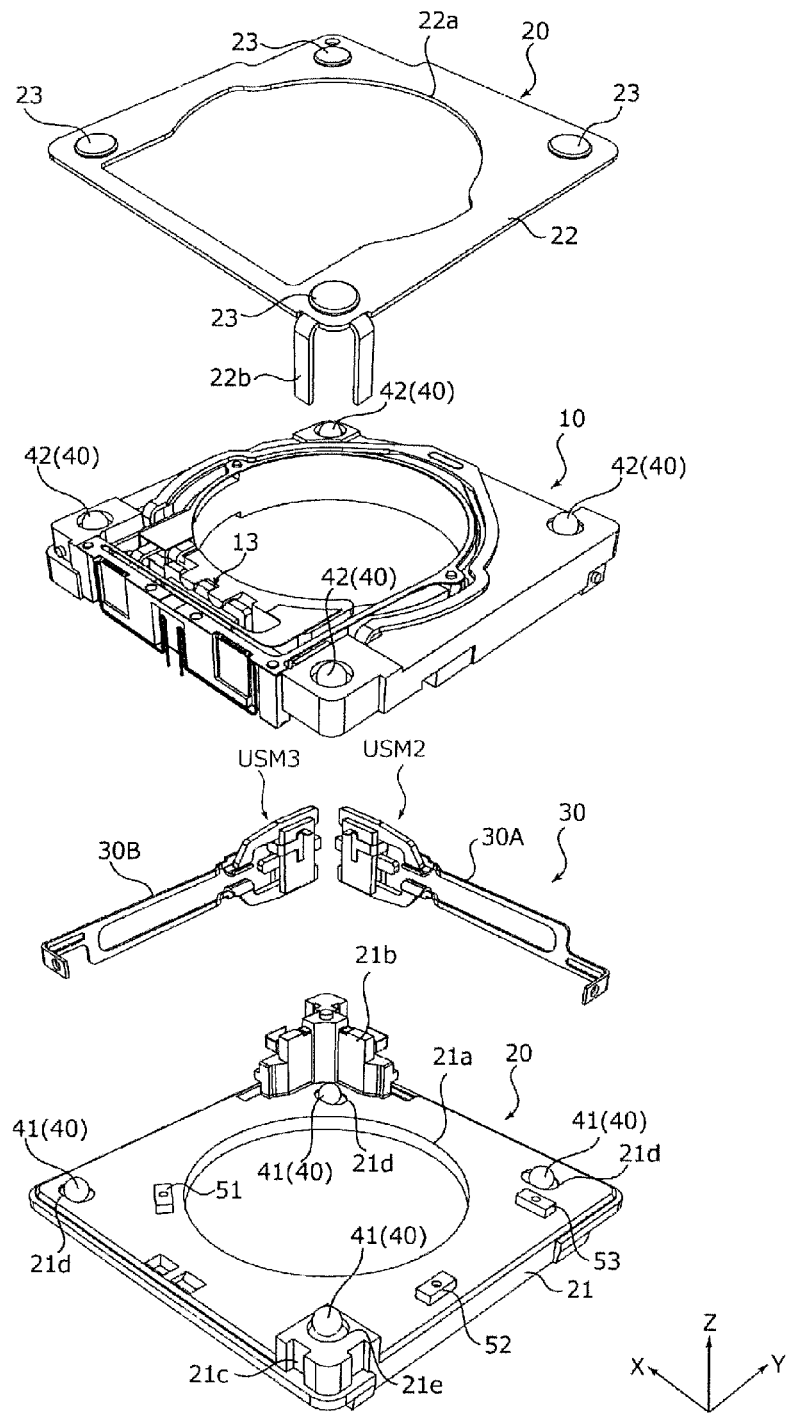
FIG. 5 is an exploded perspective view of the lens driving device.

FIGS. 4 and 5 are exploded perspective views of lens driving device 1. FIG. 5 illustrates a state in which FIG. 4 has been rotated by 180° around the Z-axis.

As shown in FIGS. 4 and 5, lens driving device 1 includes OIS movable part 10, OIS fixing part 20, OIS driving part 30, and OIS supporting part 40 in the present embodiment. FIGS. 4 and 5 omit wires 25 (see FIG. 11) to be formed on base 21.

OIS movable part 10 rocks in the optical-axis-orthogonal plane during shake correction. OIS movable part 10 includes an AF unit having AF movable part 11, AF fixing part 12, and AF driving part 13 (see FIGS. 7 to 9). OIS movable part 10 is disposed to be spaced apart from OIS fixing part 20 in the optical-axis direction, and is coupled with OIS fixing part 20 by OIS supporting part 40. The configuration of OIS movable part 10 will be described later in detail.

OIS fixing part 20 is connected to OIS movable part 10 via OIS supporting part 40. In the present embodiment, OIS fixing part 20 includes base 21 and spacer 22. OIS movable part 10 is sandwiched between base 21 and spacer 22 in the optical-axis direction.

Base 21 is a rectangular member in plan view, and includes circular opening 21a at the center of base 21. Base 21 includes, at a corner of its rectangle, OIS motor fixing portion 21b at which OIS driving part 30 is disposed. Base 21 also includes, at a position diagonal to OIS motor fixing portion 21b, spacer fixing portion 21c at which leg portions 22b of spacer 22 are disposed. OIS motor fixing portion 21b and spacer fixing portion 21c are formed so as to protrude from the base surface toward the light reception side in the optical-axis direction.

First Hall element 51 for detecting the Z position of AF movable part 11 (see FIGS. 7 to 9) and second Hall elements 52 and 53 for detecting the X and Y positions of OIS movable part 10 are disposed on base 21. First magnet 61 is disposed on AF movable part 11 to face first Hall element 51, and second magnets 62 and 63 are disposed on OIS movable part 10 (first stage 12) to face second Hall elements 52 and 53, respectively (see FIG. 9).

Base 21 is formed of molding material made of, for example, polyarylate (PAR), PAR alloy (e.g., PAR/PC) in which a plurality of resin materials including PAR are mixed, or liquid crystal polymer.

Base 21 is preferably a resin mold in which 3D-shape wires 25 (see FIG. 11) are formed, a so-called Molded Interconnect Device (3D-MID). This allows complicated wires 25 to be formed without using a printed circuit board. Wires 25 include power feeding and signal line 251 for first Hall element 51, power feeding and signal line 252 for second Hall element 52, power feeding and signal line 253 for second Hall element 53, power feeding line 254 for AF driving part 13, and power feeding line 255 for OIS driving part 30. The ends of wires 25 are pulled out to the side surfaces of base 21.

Base 21 includes ball housings 21d and 21e that house each ball 41. Ball housing 21e provided in the upper surface of spacer fixing portion 21c is dented in a circular shape and the remaining three ball housings 21d are each dented in an ellipsoidal form extending along the X-direction. The side surfaces of ball housings 21d are each formed in a tapered form so as to narrow their groove width toward the bottom.

Figure 7:
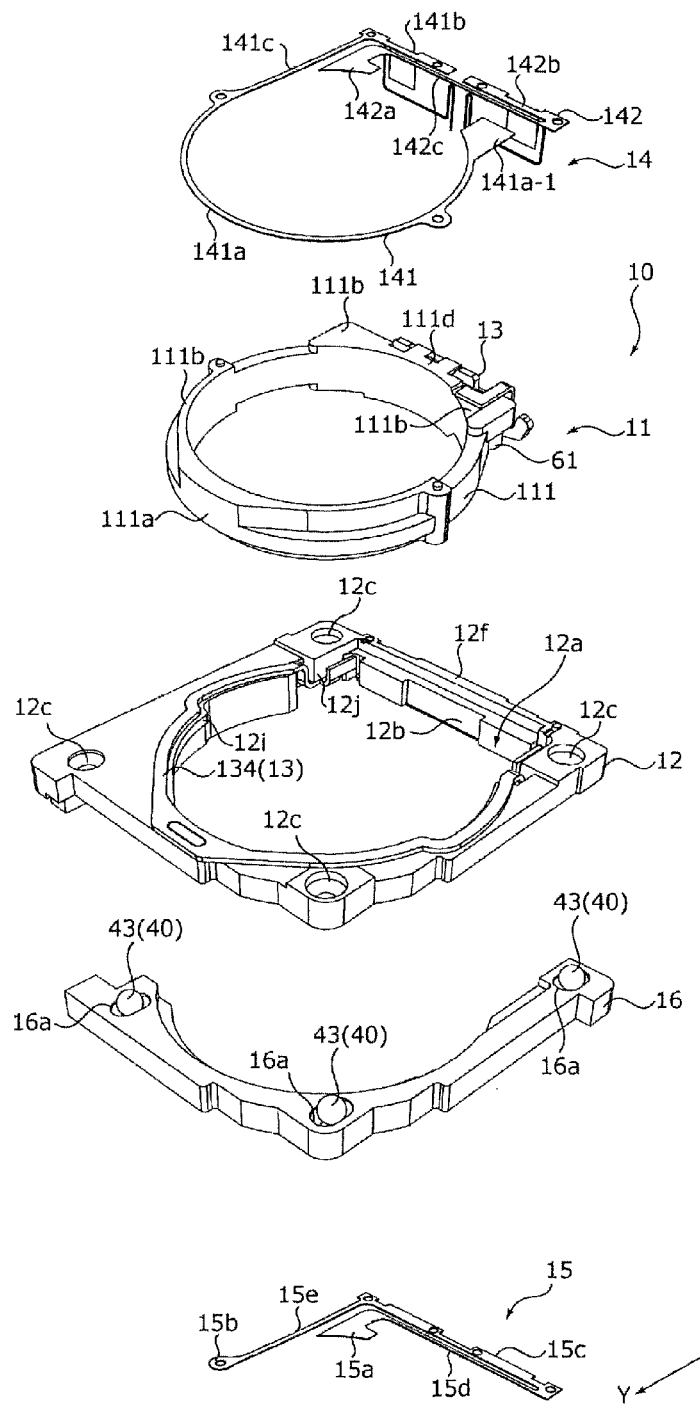
FIG. 7 is an exploded perspective view of an OIS movable part.
Figure 8:
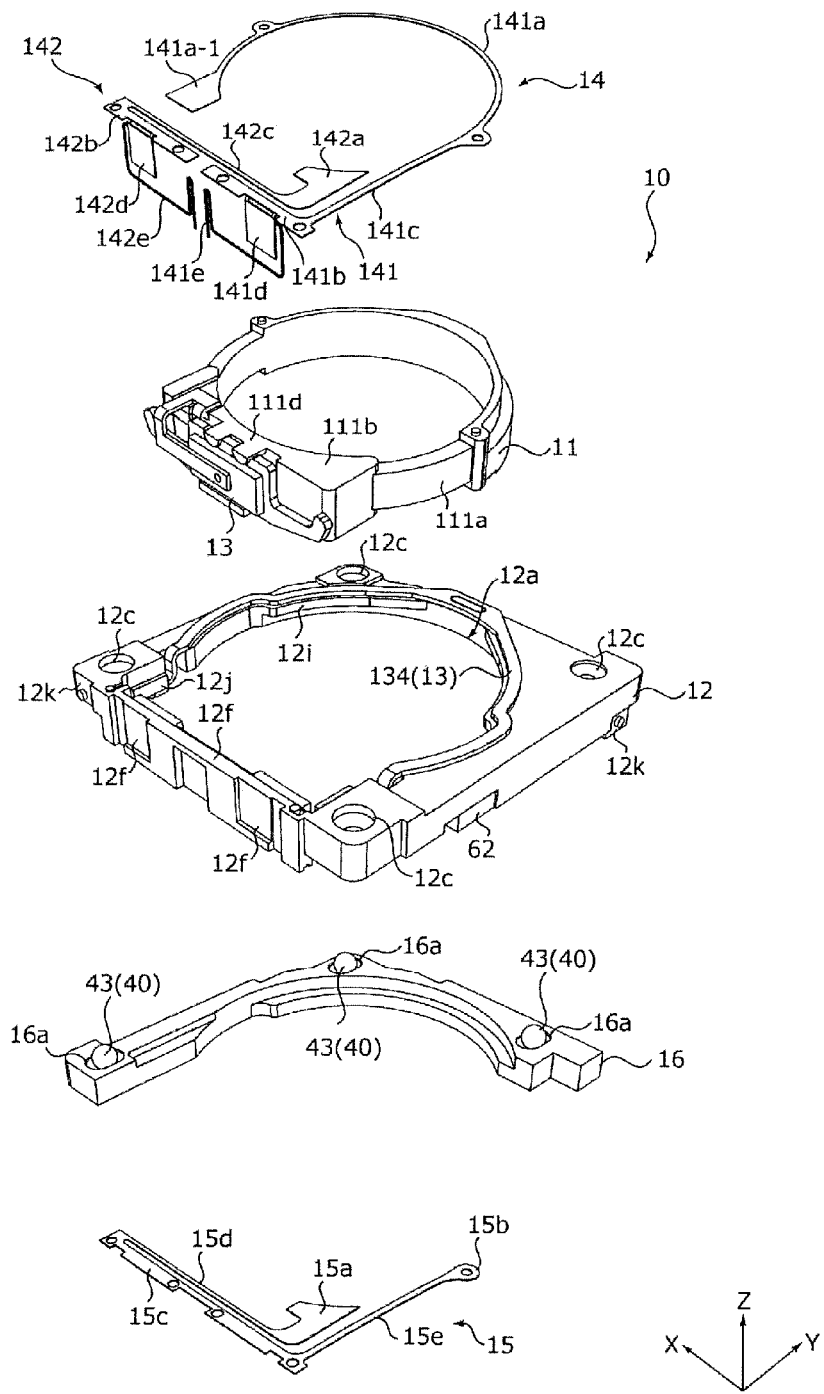
FIG. 8 is an exploded perspective view of the OIS movable part.
Figure 9:
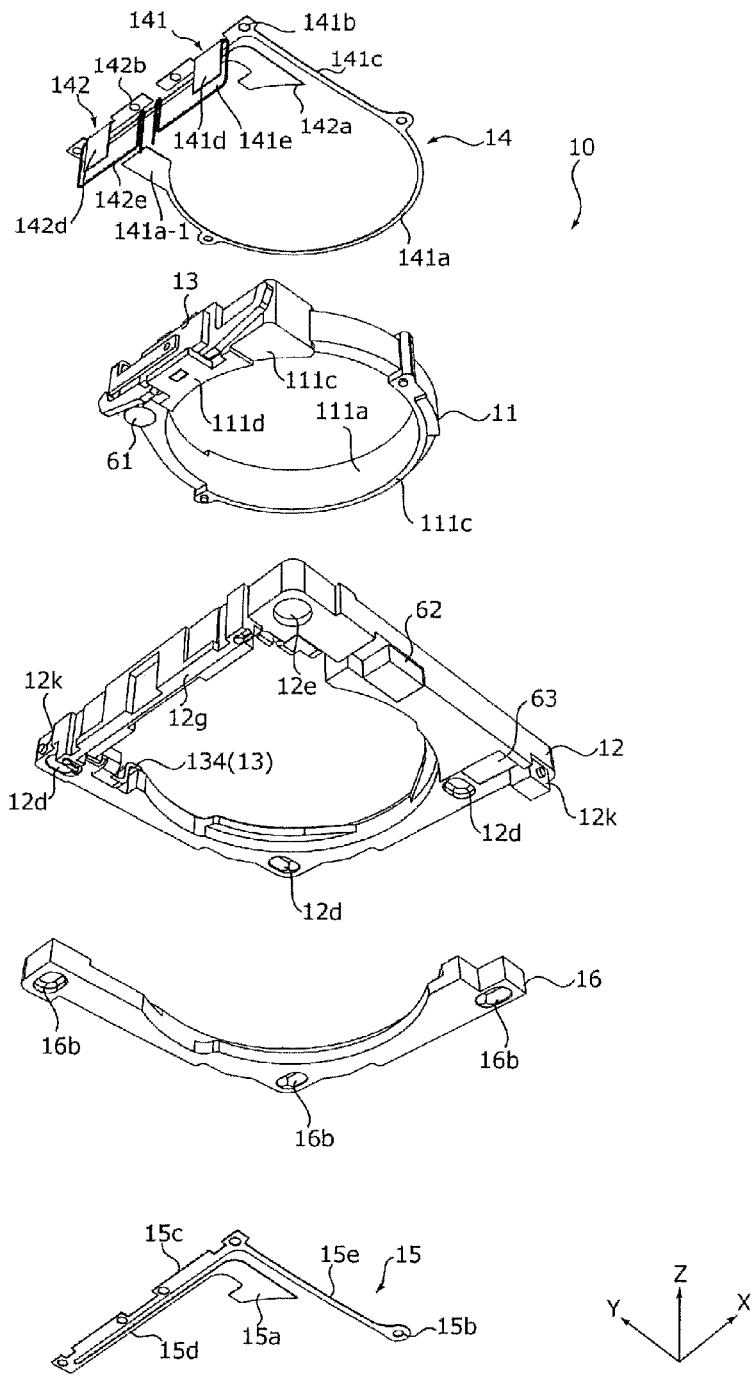
FIG. 9 is an exploded perspective view of the OIS movable part.

Spacer 22 is a rectangular member in plan view, and has an opening 22a in a portion corresponding to AF movable part 11 (lens holder 111, see FIGS. 7 to 9). Spacer 22 includes, at a corner of its rectangle, leg portion 22b extending on the image formation side in the optical-axis direction. Leg portion 22b of spacer 22 is fit into spacer fixing portion 21c of base 21 and is adhered therein, so that OIS movable part 10 is held between base 21 and spacer 22 so as to be able to rock. Spacer 22 and OIS supporting part 40 function as a pressing portion that presses OIS movable part 10 to base 21. Specifically, when spacer 22 is attached to base 21, first stage 12 is pressed against second stage 16, and second stage 16 is pressed against base 21. At this time, balls 42 are interposed between spacer 22 and OIS movable part 10 (first stage 12), and balls 41 are interposed between OIS movable part 10 (second stage 16) and base 21. Further, balls 43 are interposed between first stage 12 and second stage 16 (see FIG. 7). With this configuration, OIS movable part 10 can be held without rattling of OIS movable part 10.

Dampers 23 are disposed on the upper surface of spacer 22. In the present embodiment, dampers 23 are each disposed at four corners on the upper surface of the spacer. Dampers 23 relieve an impact from cover 3 when the device is dropped, so that the impact resistance is improved.

OIS supporting part 40 supports OIS fixing part 20 so as to be spaced apart from OIS movable part 10 in the optical-axis direction. In the present embodiment, OIS supporting part 40 includes four balls 41 interposed between OIS movable part 10 and base 21, and four balls 42 interposed between OIS movable part 10 and spacer 22. One of balls 41 is disposed between base 21 and first stage 12, and the remaining three are disposed between base 21 and second stage 16. Balls 41 and 42 support OIS movable part 10 so as to be spaced apart from OIS fixing part 20. In addition, OIS supporting part 40 includes, at OIS movable part 10, three balls 43 interposed between first stage 12 and second stage 16 (see FIG. 7).

The present embodiment allows OIS movable part 10 to accurately rock in the XY plane by regulating the direction in which balls 41 to 43 (a total of 11 balls) constituting OIS supporting part 40 are able to roll. The number of balls 41 to 43 that constitute OIS supporting part 40 can be appropriately changed.

OIS driving part 30 includes first OIS driving part 30A configured to move OIS movable part 10 in the X-direction, and second OIS driving part 30B configured to move OIS movable part 10 in the Y-direction. Each of first OIS driving part 30A and second OIS driving part 30B is an ultrasonic motor-type actuator and is fixed to OIS motor fixing portion 21b of OIS fixing part 20. First OIS driving part 30A is disposed extending along the X-direction, and second OIS driving part 30B is disposed extending along the Y-direction. That is, first OIS driving part 30A and second OIS driving part 30B are disposed along the sides orthogonal to each other. In the present embodiment, first OIS driving part 30A and second OIS driving part 30B are fixed to motor fixing portion 21b of base 21, so that OIS motors USM2 and USM3 come close to each other, thereby simplifying wires 255 (see FIG. 11) for OIS motors USM2 and USM3.

Figure 6A:
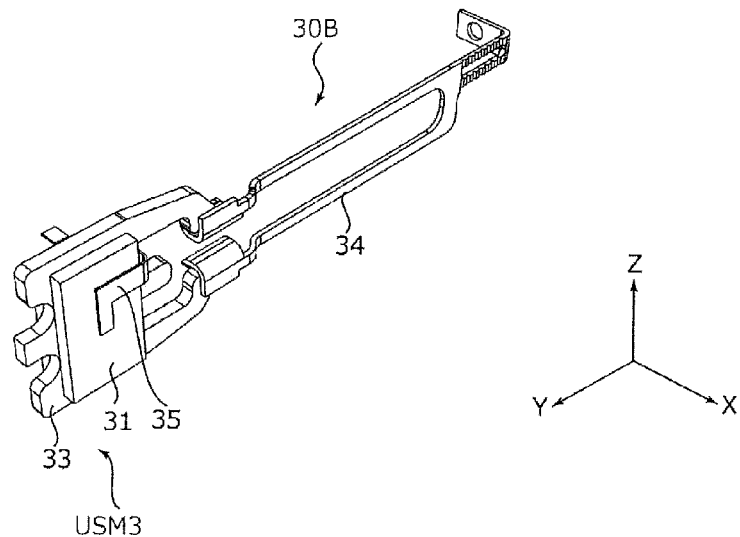
FIGS. 6A and 6B are perspective views of an OIS driving part.
Figure 6B:
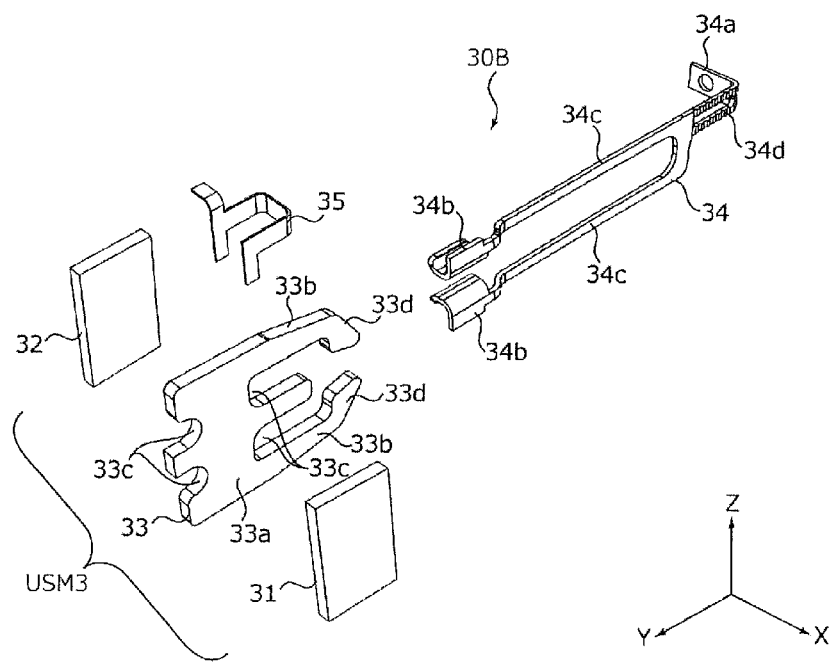

The configuration of OIS driving part 30 is shown in FIGS. 6A and 6B. FIG. 6A illustrates a state in which the members of second OIS driving part 30B are assembled, and FIG. 6B illustrates a state in which the members of second OIS driving part 30B are disassembled. The configuration of first OIS driving part 30A is not illustrated because it is the same as the configuration of second OIS driving part 30B.

As shown in FIGS. 6A and 6B, second OIS driving part 30B includes OIS motor USM3 that generates a driving force and OIS power transmission part 34 that transmits the driving force to OIS movable part 10. Similarly, first OIS driving part 30A includes OIS motor USM2 that generates a driving force and OIS power transmission part 34 that transmits the driving force to OIS movable part 10.

Each of OIS motors USM2 and USM3 includes OIS piezoelectric elements 31 and 32 and OIS resonance part 33, and OIS electrode 35.

OIS piezoelectric elements 31 and 32 are, for example, a plate element formed of ceramic material, and generate vibration by applying high frequency voltage.

OIS resonance part 33 is formed of conductive material, and resonates with vibrations of OIS piezoelectric elements 31 and 32 to convert a vibrational motion into a linear motion in the X- or Y-direction.

OIS resonance part 33 includes body portions 33a and arm portions 33b. Body portion 33a includes two depressed portions 33c having a generally rectangular plate shape formed each on the right and left sides (sides along the Z-direction in FIG. 6B) thereof. Arm portion 33b is formed so as to protrude from the vertical sides (sides along the Y-direction in FIG. 6B) of body portion 33a toward the extending direction of the vertical sides, and end portion 33d comes in contact with OIS power transmission part 34 (hereinafter referred to as "OIS tweezer contact portion 33d").

OIS resonance part 33 has at least two resonance frequencies and deforms due to different behaviors at the resonance frequencies. In other words, the shape of OIS resonance part 33 is set so as to deform due to the different behaviors at two resonance frequencies. The term "different behaviors" refers to behaviors of advancing and retracting OIS power transmission part 34 in the X- or Y-direction.

OIS piezoelectric elements 31 and 32 are laminated to body portion 33a of OIS resonance part 33 in the thickness direction (X-direction in FIGS. 6A and 6B), and then sandwiched by OIS electrode 35, so that they are electrically connected to each other. Of wires 255 (see FIG. 11) formed on base 21, a high-pressure side wire is connected to OIS electrode 35 and a low-pressure side wire is connected to OIS resonance part 33, so that a voltage is applied to OIS piezoelectric elements 31 and 32 to thereby generate vibration.

OIS power transmission part 34 is a tweezer to be connected to OIS motors USM2 and USM3 (hereinafter referred to as "OIS tweezer 34"). OIS tweezer 34 includes stage fixing portion 34a, motor contact portions 34b, and coupling portions 34c. Stage fixing portion 34a is formed so as to bend at a right angle to the extending direction of OIS tweezer 34, and is fixed to OIS tweezer fixing portion 12k of first stage 12 (see FIGS. 8 and 9). Motor contact portion 34b is formed so as to have an almost U-shaped cross section and comes in contact with OIS tweezer contact portion 33d of OIS resonance part 33. Coupling portion 34c is a portion that couples stage fixing portion 34a and motor contact portion 34b, and is branched into two from stage fixing portion 34a so that the two portions are in parallel to each other.

The width between OIS motor contact portions 34b and 34b is set wider than the width between OIS tweezer contact portions 33d and 33d of OIS resonance part 33. This allows OIS tweezer 34 to function as a plate spring when OIS tweezer 34 is attached to OIS motors USM2 and USM3, so that a biasing force acts in a direction in which OIS tweezer contact portions 33d are pushed and expanded. This biasing force allows OIS tweezer 34 to be held between OIS tweezer contact portions 33d and 33d, so that power from OIS resonance part 33 is efficiently transmitted to OIS tweezer 34.

In the present embodiment, OIS driving part 30 is composed of OIS motors USM2 and USM3 and OIS power transmission parts 34, so that the moving distance of OIS movable part 10 can be increased.

The present embodiment provides, between stage fixing portion 34a and coupling portion 34c, bellows-shaped flexible portion 34d that allows moving in the X- or Y-direction. This makes it possible to prevent the movement of OIS movable part 10 by one OIS motor (e.g., OIS motor USM2) from being interrupted by OIS tweezer 34 connected to the other OIS motor (e.g., OIS motor USM3). That is, this can prevent OIS movable part 10 from rotating around the Z-axis, so that OIS movable part 10 can be accurately rocked in the XY plane.

FIGS. 7 to 9 are exploded perspective views of OIS movable part 10. FIG. 8 illustrates a state in which FIG. 7 has been rotated by 180° around the Z-axis. FIG. 9 is a lower perspective view of FIG. 8.

As shown in FIGS. 7 to 9, OIS movable part 10 includes AF movable part 11, AF fixing part 12, AF driving part 13, and AF supporting parts 14 and 15 in the present embodiment.

AF movable part 11 moves in the optical-axis direction during focusing. AF movable part 11 is disposed to be spaced apart from AF fixing part 12, and is connected with AF fixing part 12 by AF supporting parts 14 and 15. In the present embodiment, AF fixing part 12 is composed of a first stage (hereinafter referred to as "first stage 12").

AF movable part 11 includes lens holder 111 configured to hold lens part 2 (see FIG. 2). Lens holder 111 is formed of, for example, polyarylate (PAR), PAR alloy in which a plurality of resin materials including PAR are mixed, liquid crystal polymer, or the like. Lens holder 111 includes lens housing 111a that is cylindrical. Lens part 2 (see FIG. 2) is fixed to lens housing 111a, for example, by adhesion.

Lens holder 111 includes, at the upper outer peripheral edge of lens housing 111a, upper-spring fixing portion 111b for fixing AF supporting part 14. Lens holder 111 includes, at the lower outer peripheral edge of lens housing 111a, lower-spring fixing portion 111c for fixing AF supporting part 15. Lens holder 111 includes, at one side portion along the X-direction, AF motor fixing portion 111d configured to fix AF driving part 13. Lens holder 111 also has first magnet 61 for detecting the Z-position disposed so as to face first Hall element 51 in the Z-direction. In the present embodiment, first magnet 61 is disposed near AF driving part 13. First magnet 61 has, for example, a cylindrical shape and is magnetized in the Z-direction (longitudinal direction).

First stage 12 supports AF movable part 111 via AF supporting parts 14 and 15. Second stage 16 is disposed on the image formation side of first stage 12 in the optical-axis direction and is coupled to first stage 12 via balls 43. First stage 12 moves in the X- and Y-directions during shake correction, and second stage 16 moves only in the X-direction during shake correction.

First stage 12 is a generally rectangular cylindrical member, and is formed of, for example, liquid crystal polymer. First stage 12 has a generally circular opening 12a in a portion corresponding to lens holder 111. Opening 12a has depressed portion 12b in the area corresponding to AF driving part 13, and AF piezoelectric element 131 (see FIG. 10) on the outer side is disposed in this depressed portion 12b, thereby achieving miniaturization.

First stage 12 includes, in its upper surface, four first ball housings 12c configured to house each ball 42. First ball housings 12c are dented in a circular shape, each having, in its bottom, a ball holding hole (whose reference numeral is omitted) formed to hold ball 42 in the center of the hole.

First stage 12 includes, in its lower surface, three second ball housings 12d configured to house each ball 43 and third ball housing 12e configured to house ball 41. Second ball housings 12d are each dented in an ellipsoidal form extending along the Y-direction. Third ball housing 12e is dented in a circular form. The side surfaces of second ball housings 12d are each formed in a tapered form so as to narrow their groove width toward the bottom.

First stage 12 has, at the upper surface and external side surface of one side wall along the X-direction, upper-spring fixing portion 12f for fixing AF supporting part 14. First stage 12 has, at the lower surface of one side wall along the X-direction, lower-spring fixing portion 12g for fixing AF supporting part 15.

First stage 12 has, at the lower surface of one side wall along the Y-direction, second magnets 62 and 63 for detecting the X- and Y-positions disposed so as to face second Hall elements 52 and 53 in the Z-direction. Second magnets 62 and 63 are magnetized in the Y-direction and the X-direction, respectively.

First stage 12 includes, at the upper peripheral edge portion of opening 12a, AF tweezer fixing portion 12i in which AF power transmission part 134 is disposed. First stage 12 includes AF tweezer fastening portion 12j configured to fasten AF power transmission part 134.

Second stage 16 is an L-shaped member and is formed of, for example, liquid crystal polymer. The inner circumferential surface of second stage 16 is formed in an arcuate form along the external shape of lens holder 111. That is, when AF supporting part 15 is fixed to first stage 12, second stage 16 is configured not to be positioned in the area corresponding to AF supporting part 15. If second stage 16 is rectangularly arranged, AF supporting part 15 and second stage 16 are interfered with each other when AF movable part 11 is moved to the image formation side in the optical-axis direction. Therefore, in order to avoid such interference, the spaced distance between first stage 12 and second stage 16 needs to be increased. In contrast to this, the present embodiment provides second stage 16 having an L-shape, so that the spaced distance therebetween can be reduced, which in turn can reduce the profile of the embodiment.

Second stage 16 includes, in its upper surface, three first ball housings 16a configured to house each ball 43. First ball housings 16a face second ball housings 12d in first stage 12. First ball housings 16a are each dented in an ellipsoidal form extending along the Y-direction. The side surfaces of second ball housings 12d are each formed in a tapered form so as to narrow their groove width toward the bottom.

Second stage 16 includes, in its lower surface, three second ball housings 16b configured to house each ball 41. Second ball housings 16b face ball housings 21d of base 21. Second ball housings 16b are each dented in an ellipsoidal form extending along the X-direction. The side surfaces of second ball housings 16b are each formed in a tapered form so as to narrow their groove width toward the bottom.

Three balls 41 that constitute OIS supporting part 40 are sandwiched between ball housings 21d of base 21 and second ball housings 16b of second stage 16 at multipoint contact. Therefore, balls 41 stably roll in the Y-direction.

Balls 43 are sandwiched between first ball housings 16a of second stage 16 and second ball housings 12d of first stage 12 at multipoint contact. Therefore, balls 43 stably roll in the X-direction.

Balls 42 are sandwiched between first ball housings 12c of first stage 12 and spacer 22.

AF supporting part 14 is an upper elastic supporting member that supports AF movable part 11 (lens holder 111) on the light reception side in the optical-axis direction (upper side) with respect to first stage 12 (AF fixing part). In the present embodiment, AF supporting part 14 is composed of two plate springs 141 and 142 (hereinafter referred to as "upper springs 141 and 142").

Upper springs 141 and 142 have a shape conforming to the peripheral edge portion of lens housing 111a of lens holder 111, and is formed of titanium copper, nickel copper, stainless steel, or the like, for example. Upper springs 141 and 142 are disposed on lens holder 111 and first stage 12 so as not to come in contact with each other. Upper springs 141 and 142 are formed by etching and machining one sheet metal, for example.

Upper spring 141 has lens-holder holding portion 141a to be fixed to lens holder 111, stage fixing portion 141b to be fixed to first stage 12, and arm portion 141c to be coupled between lens-holder holding portion 141a and stage fixing portion 141b. Lens-holder holding portion 141a is formed in an arcuate form along the peripheral edge portion of lens housing 111a of lens holder 111, and open end 141a-1 has a shape corresponding to upper-spring fixing portion 111b that is positioned at one end of AF motor fixing portion 111d of lens holder 111. Stage fixing portion 141b is formed linearly along the Y-direction and a part thereof is bent vertically (bent portion 141d). Arm portion 141c is linearly formed and is elastically deformed along with the movement of AF movable part 11. In addition, upper spring 141 extends from the bent portion 141d along the shape of the side wall of first stage 12, and has wire portion 141e to be connected to power feeding terminal 254a (see FIG. 11) of base 21. The end of wire portion 141e is bent in the Z-direction and can follow the movement of AF movable part 11 toward the Z-direction.

Upper spring 142 has lens-holder holding portion 142a to be fixed to lens holder 111, stage fixing portion 142b to be fixed to first stage 12, and arm portion 142c to be coupled between lens-holder holding portion 142a and stage fixing portion 142b. Lens-holder holding portion 142a has a shape corresponding to upper-spring fixing portion 111b that is positioned at the other end of AF motor fixing portion 111d of lens holder 111. Stage fixing portion 142b is linearly formed and a part thereof is bent vertically (bent portion 142d). Arm portion 142c is formed linearly along the X-direction and is elastically deformed along with the movement of AF movable part 11. In addition, upper spring 142 extends from the bent portion 142d along the shape of the side wall of first stage 12, and has wire portion 142e to be connected to power feeding terminal 254b (see FIG. 11) of base 21. The end of wire portion 142e is bent in the Z-direction and can follow the movement of AF movable part 11 toward the Z-direction.

In the present embodiment, upper springs 141 and 142 are positioned to lens holder 111 and fixed, for example, adhesively thereto by fitting and inserting positioning bosses (whose reference numeral is omitted) of upper-spring fixing portion 111b of lens holder 111 into fixing holes (whose reference numeral is omitted) of lens-holder holding portions 141a and 142a. Further, upper springs 141 and 142 are positioned to first stage 12 and fixed, for example, adhesively thereto by disposing bent portions 141d, 142d of magnet-holder fixing portions 141b and 142b to upper spring fixing portion 12f of first stage 12. The methods of positioning and fixing upper springs 141 and 142 as described above are merely illustrative, and other known methods may be applied.

Figure 11:
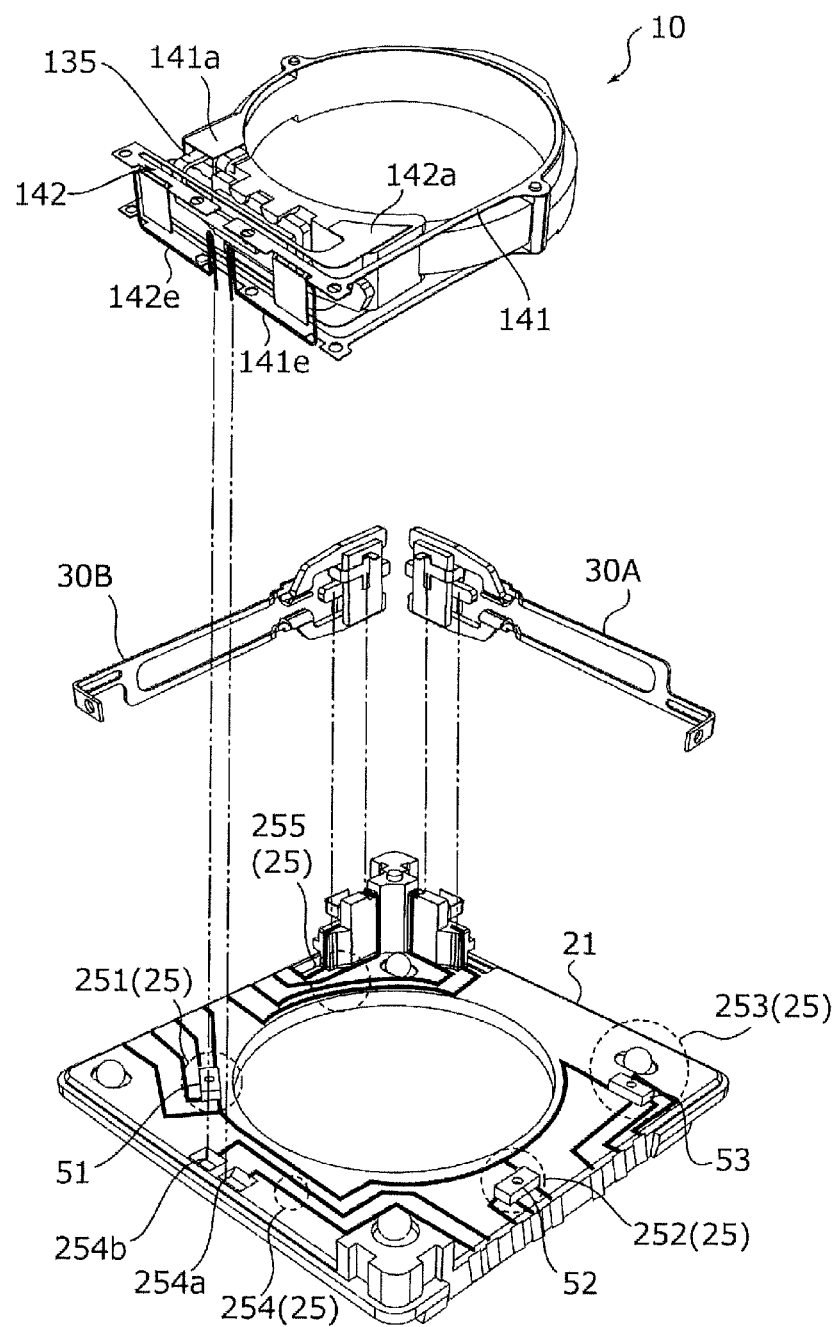
FIG. 11 illustrates a power feeding system and a signal system of the lens driving device.

At this time, as shown in FIG. 11, lens-holder holding portion 141a of upper spring 141 is electrically connected to AF electrode 135 of AF driving part 13, and lens-holder holding portion 142a of upper spring 142 is electrically connected to AF resonance part 133 of AF driving part 13. Wire portions 141e and 142e are each disposed in a deformable state on the side wall of first stage 12, and are electrically connected to power feeding terminals 254a, 254b of base 21, respectively. Therefore, electricity is supplied to AF driving part 13 via upper springs 141 and 142.

AF supporting part 15 is a lower elastic supporting member that supports AF movable part 11 (lens holder 111) on the image formation side in the optical-axis direction (lower side) with respect to first stage 12 (AF fixing part). In the present embodiment, AF supporting part 15 is composed of one plate spring (hereinafter referred to as "lower spring 15").

Lower spring 15 entirely has an L-shape, and is formed of titanium copper, nickel copper, stainless steel, or the like, for example. Lower spring 15 is formed by etching one sheet metal, for example.

Lower spring 15 has lens-holder holding portions 15a and 15b to be fixed to lens holder 111, stage fixing portion 15c to be fixed to first stage 12, and arm portion 15d to be coupled between lens-holder holding portion 15a and stage fixing portion 15b, and arm portion 15e to be coupled between lens-holder holding portion 15b and stage fixing portion 15c. Lens-holder holding portion 15a has a shape corresponding to lower-spring fixing portion 111c that is positioned at one side of AF motor fixing portion 111d of lens holder 111. Stage fixing portion 15c is linearly formed. Each of arm portions 15d and 15e is formed linearly along the X- and Y-directions, and is elastically deformed along with the movement of AF movable part 11.

In the Z-direction, lower spring 15 is disposed in parallel to upper springs 141 and 142. At this time, lens-holder holding portion 15a, stage fixing portion 15b, arm portion 15c, and arm portion 15e of lower spring 15 correspond to lens-holder holding portion 142a of upper spring 142, stage fixing portions 141b and 142b of upper springs 141 and 142, arm portion 142c of upper spring 142, and arm portion 141c of upper spring 141, respectively. With this configuration, it is possible to prevent tilt from occurring when AF movable part 11 is moved in the Z-direction.

In the present embodiment, lower spring 15 is positioned to lens holder 111 and fixed thereto by fitting and inserting the positioning boss of lower-spring fixing portion 111c of lens holder 111 into the fixing hole of lens-holder holding portion 15b. Further, lower spring 15 is positioned to first stage 12 and fixed thereto by fitting and inserting positioning bosses of lower-spring fixing portion 12g of first stage 12 into fixing holes of lens-holder holding portion 15c. The methods of positioning and fixing lower spring 15 as described above are merely illustrative, and other known methods may be applied.

AF driving part 13 allows AF movable part 11 to move in the Z-direction. Similarly to OIS driving part 30, AF driving part 13 is an ultrasonic motor-type actuator and is fixed to AF movable part 11 (AF motor fixing portion 111d of lens holder 111).

Figure 10A:
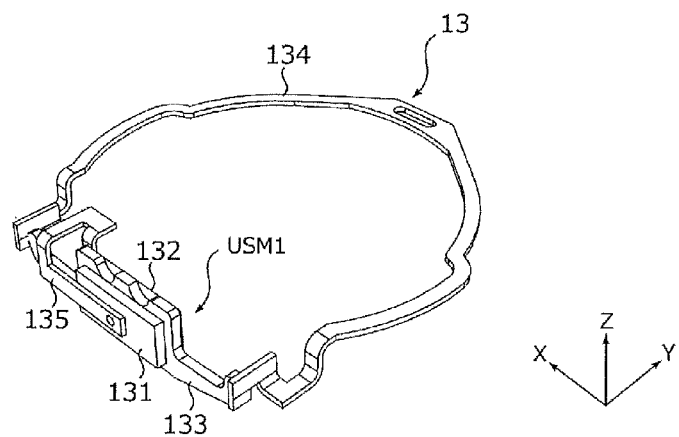
FIGS. 10A and 10B are perspective views of an AF movable part.
Figure 10B:
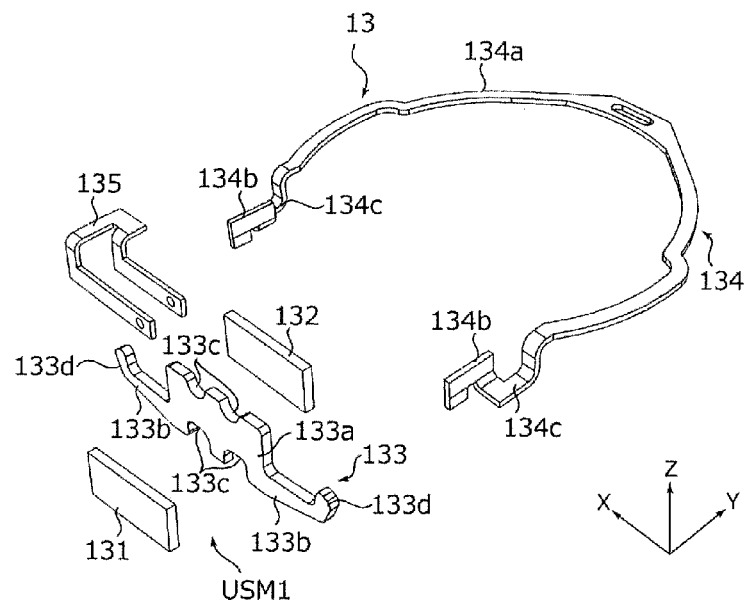

The configuration of AF driving part 13 is shown in FIGS. 10A and 10B. FIG. 10A illustrates a state in which the members of AF driving part 13 are assembled, and FIG. 10B illustrates a state in which the members of AF driving part 13 are disassembled.

As shown in FIGS. 10A and 10B, AF driving part 13 includes AF motor USM1 that generates a driving force and AF power transmission part 134 that transmits the driving force to AF movable part 11.

AF motor USM1 includes AF piezoelectric elements 131 and 132 and AF resonance part 133, and AF electrode 135.

AF piezoelectric elements 131 and 132 are, for example, a plate element formed of ceramic material, and generates vibration by applying high frequency voltage.

AF resonance part 133 is formed of conductive material, and resonates with vibrations of AF piezoelectric elements 131 and 132 to convert a vibrational motion into a linear motion in the Z-direction.

AF resonance part 133 includes body portion 133a and arm portion 133b. Body portion 133a includes two depressed portions 133c having a generally rectangular plate shape formed each on the upper and lower sides (sides along the X-direction in FIG. 10B) thereof. Arm portion 133b is formed so as to protrude from the vertical sides (sides along the Z-direction in FIG. 10B) of body portion 133a toward the extending direction of the vertical sides, and end portion 133d comes in contact with AF power transmission part 134 (hereinafter referred to as "AF tweezer contact part 133d").

AF resonance part 133 has at least two resonance frequencies and deforms due to different behaviors at the resonance frequencies. In other words, the shape of AF resonance part 133 is set so as to deform due to the different behaviors at two resonance frequencies. The term "different behaviors" refers to behaviors of advancing and retracting AF power transmission part 134 in the Z-direction.

AF piezoelectric elements 131 and 132 are laminated to body portion 133a of AF resonance part 133 in the thickness direction (Y-direction in FIGS. 10A and 10B), and then sandwiched by AF electrode 135, so that they are electrically connected to each other. Upper spring 141 serving as a power feeding line on the high-pressure side is connected to AF electrode 135 and upper spring 142 on a power feeding line on the low-pressure side (GND) is connected to AF resonance part 133, so that a voltage is applied to AF piezoelectric elements 131 and 132 to thereby generate vibration.

AF power transmission part 134 is a tweezer to be sandwich AF motor USM1 (hereinafter referred to as "AF tweezer 134"). AF tweezer 134 includes stage fixing portion 134a, AF motor contact portions 134b, and coupling portions 134c. Stage fixing portion 134a has a generally arcuate shape and is fixed to AF tweezer fixing portion 12i of first stage 12. AF motor contact portion 134b has a plate shape spreading out in the YZ plane and comes in contact with AF tweezer contact portion 133d of AF resonance part 133. Coupling portion 134c couples stage fixing portion 134a and AF motor contact portion 134b together, and has a crank shape with three-dimensionally bending. Coupling portion 134c is disposed on the image formation side of AF tweezer fastening portion 12j of first stage 12 in the optical-axis direction.

The width between AF motor contact portions 134b and 134b is set narrower than the width between AF tweezer contact portions 133d and 133d of AF resonance part 133. This allows AF tweezer 134 to function as a plate spring when AF tweezer 134 is attached to AF motor USM1, so that a biasing force acts on the side of AF driving part 13. This biasing force allows AF driving part 13 to be held between AF motor contact portions 134b and 134b, so that power from AF resonance part 133 is efficiently transmitted to AF tweezer 134.

In the present embodiment, AF driving part 13 is composed of AF motor USM1 and AF power transmission part 134, so that the moving distance of AF movable part 11 (lens holder 111) can be increased.

In AF driving part 13, even though AF motor USM1 is driven so as to push down AF tweezer 134 toward the image formation side in the optical-axis direction, AF tweezer 134 does not move to the image formation side in the optical-axis direction because most of AF tweezer 134 is fixed to the upper surface of first stage 12. Further, even though AF motor USM1 is driven so as to push up AF tweezer 134 toward the light reception side in the optical-axis direction, AF tweezer 134 does not move to the light reception side in the optical-axis direction as well because distanced coupling portion 134c of AF tweezer 134 is fastened with AF tweezer fastening portion 12j of first stage 12. Thus, in AF driving part 13, AF tweezer 134 is rigidly fixed to first stage 12 (AF fixing part) and cannot move in the Z-direction. Therefore, when AF driving part 13 is driven, AF movable part 11 where AF driving part 13 is disposed moves in the Z-direction.

In lens driving device 1, first magnet 61 is disposed on AF movable part 11 (lens holder 111) and first Hall element 51 is disposed on OIS fixing part 20 (base 21). First Hall element 51 primarily detects a magnetic field formed by first magnet 61. Based on the detection result by first Hall element 51, the position of AF movable part 11 in the Z-direction can be identified.

First magnet 61 and first Hall element 51 constitute a Z-position detecting part that is configured to detect movement of AF movable part 11 in the Z-direction. By providing the Z-position detecting part, a closed loop control can be achieved, so that high precision focusing can be performed.

In the present embodiment, since first magnet 61 has a cylindrical shape, the output of first Hall element 51 depends on the displacement (equivalent to the radius setting the reference position as its origin) with respect to the reference position (position in the XY plane at the time when shake correction is not performed) of first magnet 61. That is, even though the position of OIS movable part 10 in the XY plane (hereinafter referred to as "XY position") varies, the outputs of first Hall element 51 are the same. Therefore, by converting the XY position of OIS movable part 10 into a radius to be expressed by a displacement, a correction value for offsetting the influence by shake correction can be easily calculated. Thus, even though OIS movable part 10 rocks in the XY plane by shake correction to change the magnetic field that intersects with first Hall element 51, the magnetic field can be easily corrected.

In lens driving device 1, second magnets 62 and 63 are disposed on OIS movable part 10 (first stage 12) and second Hall elements 52 and 53 are disposed on OIS fixing part 20 (base 21). Second Hall element 52 primarily detects a magnetic field formed by second magnet 62, and second hall element 53 primarily detects a magnetic field formed by second magnet 63. Based on the detection result by second Hall elements 52 and 53, the position of OIS movable part 10 in the XY plane can be identified.

Second magnets 62 and 63 and second Hall elements 52 and 53 constitute an XY-position detecting part that is configured to detect movement of OIS movable part 10 in the X- and Y-directions. By providing the XY-position detecting part, a closed loop control can be achieved, so that high precision shake correction can be performed.

In lens driving device 1, when a voltage is applied to AF driving part 13, AF piezoelectric elements 131 and 132 vibrate, and AF resonance part 133 deforms due to the behavior corresponding to the frequency. Since AF tweezer 134 is fixed to first stage 12 (AF fixing portion), AF driving part 13 moves by sliding in the Z-direction.

With this configuration, AF movable part 11 moves in the Z-direction, so that focusing is performed. At this time, feedback on the detection result by the Z-position detecting part makes it possible to accurately control translational movement of AF movable part 11.

In lens driving device 1, when a voltage is applied to OIS driving part 30, OIS piezoelectric elements 31 and 32 vibrate, and OIS resonance part 33 deforms due to the behavior corresponding to the frequency. This allows OIS tweezer 34 to move by sliding in the X- or Y-direction.

Specifically, when first OIS driving part 30A is driven to move OIS tweezer 34 in the X-direction, power is transmitted to first stage 12. Balls 43 sandwiched between first stage 12 and second stage 16 cannot roll in the X-direction, but balls 41 sandwiched between second stage 16 and base 21 can roll in the X-direction. Therefore, first stage 12 and second stage 16 move together in the X-direction while maintaining their positions in the Y-direction with respect to base 21.

Meanwhile, when second OIS driving part 30B is driven to move OIS tweezer 34 in the Y-direction, power is transmitted to first stage 12. Balls 43 sandwiched between first stage 12 and second stage 16 can roll in the Y-direction, but balls 41 sandwiched between second stage 16 and base 21 cannot roll in the Y-direction. Therefore, first stage 12 alone moves in the Y-direction while maintaining its position in the X-direction with respect to base 21.

Thus, OIS movable part 10 rocks in the XY plane to perform shake correction. Specifically, the energized voltage to OIS driving part 30 is controlled based on the detection signal indicating an angle shake from a shake detecting part (e.g., gyros sensor, not illustrated) so as to offset the angle shake of camera module A. At this time, feedback on the detection result by the XY-position detecting part makes it possible to accurately control translational movement of OIS movable part 10.

Thus, lens driving device 1 includes: an autofocus part that has AF movable part 11 to be disposed on first stage 12 (AF fixing part) and AF driving part 13 configured to move AF movable part 11 along the optical axis in the Z-direction with respect to first stage 12; and a shake-correction part that has OIS fixing part 20, OIS movable part 10 including the autofocus part, and OIS driving part 30 configured to move OIS movable part 10 in the X- and Y-directions orthogonal to the optical axis with respect to OIS fixing part 20.

OIS driving part 30 includes first OIS driving part 30A to be disposed along the X-direction and configured to move OIS movable part 10 in the X-direction, and second OIS driving part 30B to be disposed along the Y-direction and configured to move OIS movable part 10 in the Y-direction.

Each of first and second OIS driving parts 30A and 30B is composed of OIS piezoelectric elements 31 and 32 and OIS resonance part 33 that resonates with vibrations of OIS piezoelectric elements 31 and 32 to convert a vibrational motion into a linear motion in the X or Y-direction, and includes OIS motors USM2 and USM3 (shake-correcting ultrasonic motors) to be disposed on OIS fixing part 20; and OIS power transmission part 34 configured to couple OIS motors USM2 and USM3 to OIS movable part 10 and to transmit the linear motion in the X- or Y-direction to OIS movable part 10.

AF driving part 13 is composed of AF piezoelectric elements 131 and 132 and AF resonance part 133 that resonates with vibrations of AF piezoelectric elements 131 and 132 to convert a vibrational motion into a linear motion in the Z-direction, and includes AF motor USM1 (autofocusing ultrasonic motor) to be disposed on AF movable part 11; and AF power transmission part 134 configured to couple AF motor USM1 to first stage 12 and to transmit the linear motion to first stage 12.

In a rectangle defined by two sides where first OIS driving part 30A and second OIS driving part 30B are disposed, AF driving part 13 is disposed along a side different from the two sides.

Lens driving device 1 can reduce the effect of external magnetism and can be reduced in size and profile thereof. Therefore, even though camera module A having lens driving device 1 is disposed close thereto like smartphone M, there is no magnetic effect, so that lens driving device 1 is suitable for use as a dual camera.

While the invention made by the present inventor has been specifically described based on an embodiment, it is not intended to limit the present invention to the above-mentioned embodiment, but the present invention may be further modified within the scope and spirit of the invention defined by the appended claims.

For example, although the embodiment has been described by mentioning smartphone M, which is a camera-equipped mobile terminal, as an example of a camera-mounted device having camera module A, the present invention is applicable to a camera-mounted device having a camera module and an image processing section that processes image information obtained with the camera module. The camera-mounted device includes an information device or a transport device. The information device includes, for example, a camera-equipped mobile phone, a note-type personal computer, a tablet terminal, a mobile game machine, a web camera, and a camera-equipped in-vehicle apparatus (e.g., a rear-view monitor apparatus or a drive recorder apparatus). The transport device includes, for example, a vehicle.

Figure 12A:
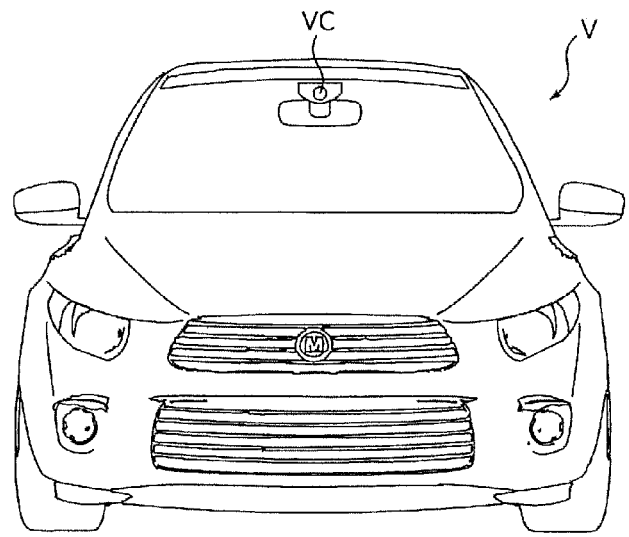
FIGS. 12A and 12B illustrate a vehicle as a camera-mounted device in which an in-vehicle camera module is mounted.
Figure 12B:
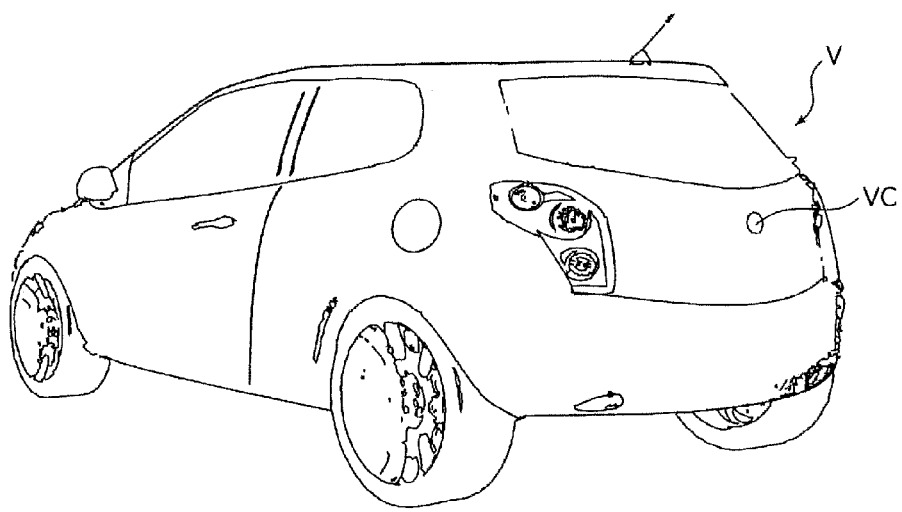

FIGS. 12A and 12B illustrate a vehicle V as a camera-mounted device in which an in-vehicle camera module VC (Vehicle Camera) is mounted. FIG. 12A is a front view of vehicle V and FIG. 12B is a rear perspective view of vehicle V. In vehicle V, camera module A described in the embodiment is mounted as in-vehicle camera module VC. As shown in FIGS. 12A and 12B, in-vehicle camera module VC may, for example, be attached to the windshield so as to face forward, or to the rear gate so as to face backward. In-vehicle camera module VC is used for rear monitoring, drive recording, collision avoidance control, automatic drive control, and the like.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

This application is entitled to and claims the benefit of Japanese Patent Application No. 2018-152250 dated Aug. 13, 2018, the disclosure of which including the specification, drawings and abstract is incorporated herein by reference in its entirety.

REFERENCE SIGNS LIST

1 Lens driving device
10 OIS movable part (shake-correction movable part)
11 AF movable part (autofocus movable part)
111 Lens holder
12 AF fixing part, first stage (autofocus fixing part)
13 AF driving part (autofocus driving part)
131, 132 AF piezoelectric elements (auto-focusing piezoelectric elements)
133 AF resonance part (auto-focusing resonance part)
134 AF power transmission part, AF tweezer (auto-focusing power transmitting part)
135 AF electrode (autofocus electrode)
14, 15 AF supporting part (auto-focusing supporting part)
16 Second stage
20 OIS fixing part (shake-correction fixing part)
21 Base
22 Spacer
30 OIS driving part (shake-correction driving part)
31, 32 OIS piezoelectric elements (shake-correcting piezoelectric elements)
33 OIS resonance part (shake-correcting resonance part)
34 OIS power transmission part, OIS tweezer (shake-correcting power transmitting part)
35 OIS electrode (shake-correction electrode)
40 OIS supporting part (shake-correction supporting part)
41 to 43 Balls
USM1 AF motor (auto-focusing ultrasonic motor)
USM2, USM3 OIS motors (shake-correcting ultrasonic motors)

The invention claimed is:

1. A lens driving device, comprising:
an autofocus part including:
an autofocus movable part to be disposed at an autofocus fixing part; and
an autofocus driving part configured to move, with respect to the autofocus fixing part,
the autofocus movable part in a Z-direction extending along an optical axis, and
a shake-correction part including:
a shake-correction fixing part;
a shake-correction movable part including the autofocus part; and
a shake-correction driving part configured to move, with respect to the shake-correction fixing part, the shake-correction movable part in an X-direction and a Y direction each orthogonal to the optical axis, wherein
the shake-correction driving part includes:
a first shake-correction driving part to be disposed along the X-direction and configured to move the shake-correction movable part in the X-direction; and
a second shake-correction driving part to be disposed along the Y-direction and configured to move the shake-correction movable part in the Y-direction, wherein each of the first and the second shake-correcting driving parts includes:
a shake-correcting ultrasonic motor composed of: a shake-correcting piezoelectric element; and a shake-correcting resonance part configured to resonate with vibrations of the shake-correcting piezoelectric element and to convert a vibrational motion into a linear motion in the X-direction or the Y-direction, the shake-correcting ultrasonic motor being configured to be disposed at the shake-correction fixing part; and
a shake-correcting power transmitting part configured to couple the shake-correcting ultrasonic motor and the shake-correction movable part together and to transmit the linear motion in the X-direction or the Y-direction to the shake-correction movable part, and wherein
the autofocus driving part includes:
an auto-focusing ultrasonic motor composed of: an auto-focusing piezoelectric element;
and auto-focusing resonance part configured to resonate with vibrations of the auto-focusing piezoelectric element and to convert a vibration motion into a linear motion in the Z-direction, the auto-focusing ultrasonic motor being configured to be disposed at the autofocus movable part; and
an auto-focusing power transmitting part configured to couple the auto-focusing ultrasonic motor and the auto-focus fixing part together and to transmit the linear motion to the autofocus fixing part, wherein,
in a rectangle defined by two sides where the first shake-correction driving part and the second shake-correction driving part are disposed, the autofocus driving part is disposed along a side different from the two sides, and wherein
the shake-correction part includes a shake-correcting supporting part configured to support the shake-correction movable part with respect to the shake-correction fixing part,
the shake-correction movable part includes: a first stage movable in the X-direction and the Y-direction; and a second stage movable in the X-direction, the shake-correction fixing part includes a base, and the shake-correcting supporting part includes a ball between the first stage and the second stage, a ball between the base and the second stage, and a ball between the base and the first stage.

2. The lens driving device according to claim 1, further comprising a pressing part configured to press the shake-correction movable part toward the base, wherein the first stage is pressed toward the second stage by the pressing part, and the second stage is pressed toward the base via the shake-correcting supporting part.

3. The lens driving device according to claim 1, wherein the base is a resin mold in which a 3D-shape wire is formed.

4. The lens driving device according to claim 1, wherein the autofocus part includes a Z-position detecting part configured to detect movement of the autofocus movable part in the Z-direction, and the shake-correction part includes an XY-position detecting part configured to detect movement of the shake-correction movable part in the X direction and the Y direction.

5. The lens driving device according to claim 4, wherein the Z-position detecting part includes: a Z-position detecting magnet to be disposed at the autofocus movable part; and a Z-position detecting Hall element to be disposed at the autofocus fixing part while facing the Z-position detecting magnet, and the XY-position detecting part includes: an X-position detecting magnet and a Y-position detecting magnet to be disposed at the shake-correction movable part; and an X-position detecting Hall element and a Y-position detecting Hall element to be disposed at the shake-correction fixing part while facing the X-position detecting magnet and the Y-position detecting magnet.

6. The lens driving device according to claim 1, wherein the shake-correcting power transmitting part includes a flexible part that allows for movement in the X-direction or the Y-direction.

7. The lens driving device according to claim 1, wherein the auto-focusing power transmitting part is fixed to be immovable in the Z-direction with respect to the shake-correction fixing part.

8. The lens driving device according to claim 1, wherein the autofocus part includes an auto-focusing supporting part configured to support the autofocus movable part with respect to the autofocus fixing part, wherein the auto-focusing supporting part is composed of an upper spring and a lower spring configured to hold, in between, the autofocus movable part and the autofocus fixing part in the Z-direction.

9. The lens driving device according to claim 8, wherein the upper spring and the lower spring include an arm part configured to deform along with movement in the Z-direction, wherein the arm part is formed parallel to and along the X-direction or the Y-direction.

10. The lens driving device according to claim 8, wherein the upper spring forms a power feeding path to the auto-focusing piezoelectric element.

11. A camera module, comprising:

the lens driving device according to claim 1;

a lens part to be mounted at the autofocus movable part; and an image capturing part configured to capture a subject image imaged by the lens part.

12. A camera-mounted device that is an information device or a transporting device, the camera-mounted device comprising:

the camera module according to claim 11; and an image processing part configured to process image information obtained by the camera module.

* * * * *